A. S. ANDERSON.
TRANSMISSION MECHANISM.
APPLICATION FILED DEC. 5, 1914.
1,143,928.
Patented June 22, 1915.
2 SHEETS—SHEET 2.
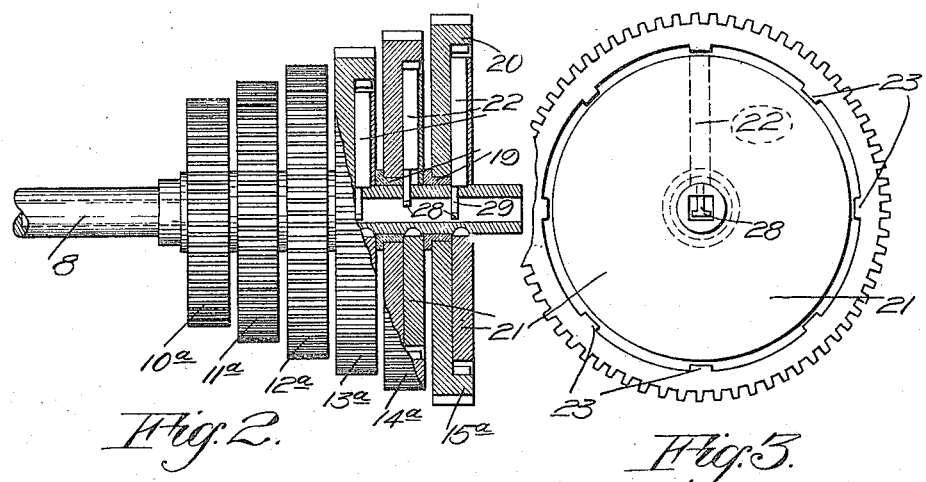
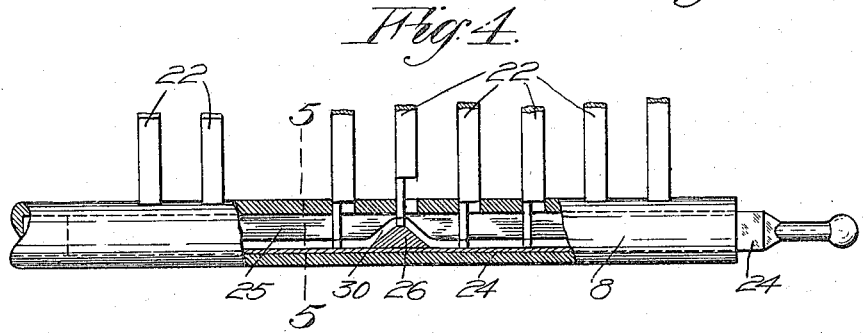
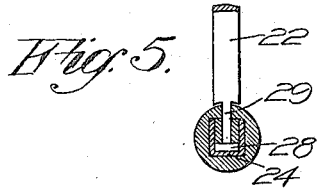
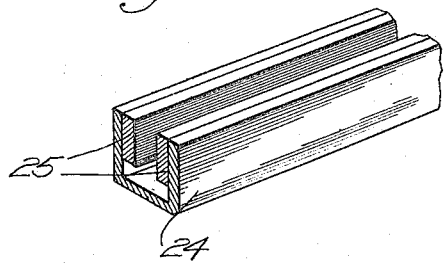
WITNESSES:
Charles Rokles
Thos Leistberg
INVENTOR
Andrew S. Anderson
BY G. H. Strong.
ATTORNEY

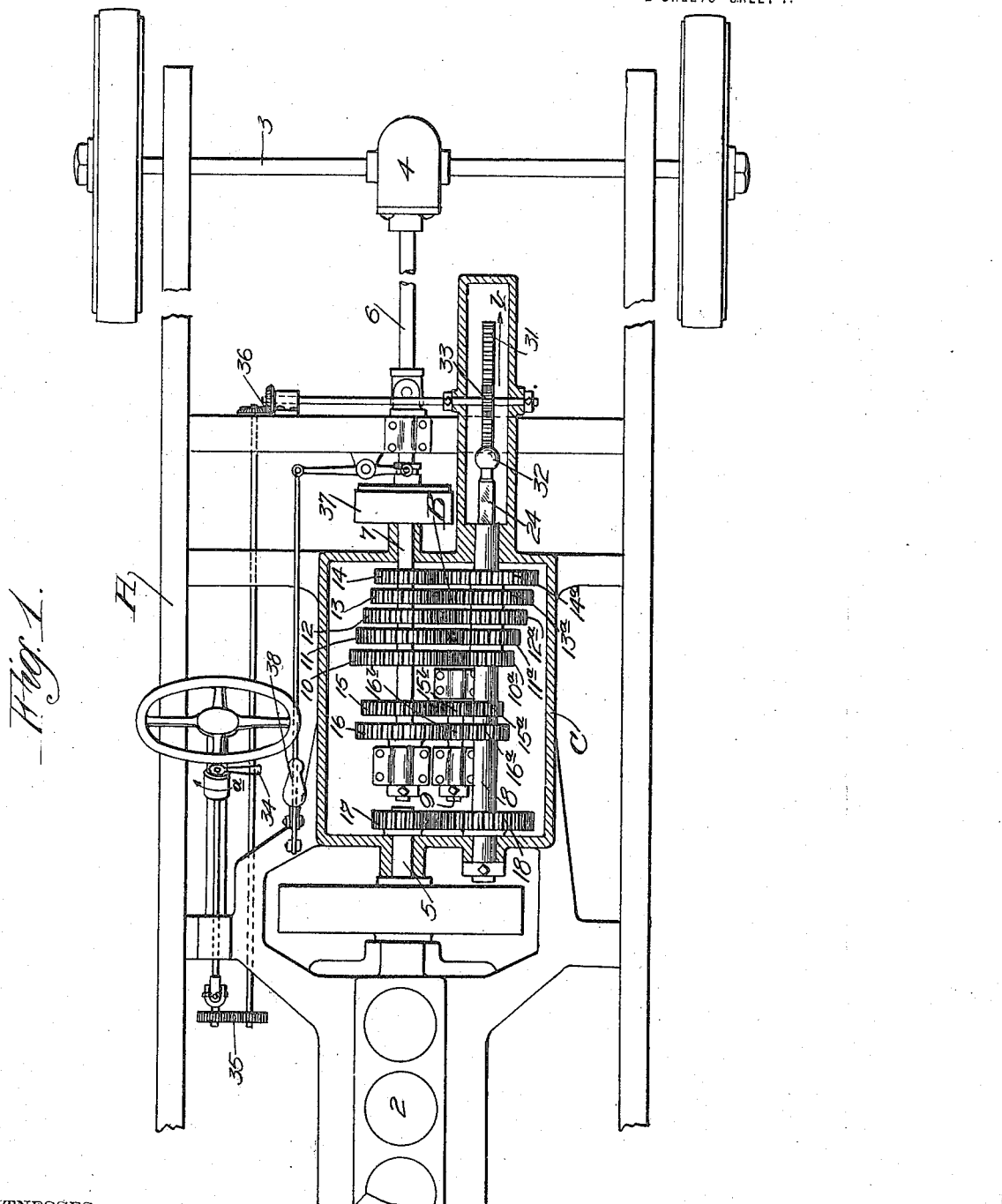

UNITED STATES PATENT OFFICE.

ANDREW S. ANDERSON, OF POINT RICHMOND, CALIFORNIA, ASSIGNOR OF NINE ONE-HUNDREDTHS TO CHARLES H. WOODRUFF AND TWENTY-FIVE ONE-HUNDREDTHS TO WILLIAM B. RICHMOND, OF RICHMOND, CALIFORNIA, AND FIFTEEN ONE-HUNDREDTHS TO JOHN ROTH, OF POINT RICHMOND, CALIFORNIA.

TRANSMISSION MECHANISM.

1,143,928.　　　Specification of Letters Patent.　　Patented June 22, 1915.

Application filed December 5, 1914. Serial No. 875,620.

*To all whom it may concern:*

Be it known that I, ANDREW S. ANDERSON, a citizen of the United States, residing at Point Richmond, in the county of Contra Costa and State of California, have invented new and useful Improvements in Transmission Mechanism, of which the following is a specification.

This invention relates to a transmission mechanism of the progressive type.

It is one of the objects of the present invention to provide a transmission mechanism of the progressive type in which the gears intermesh and in which changes may be made from one gear unit to another, either ahead or reverse, without releasing the engine clutch and without causing any noticeable shock. Another object of the invention is to provide a transmission mechanism of the character described which is simple, compact and durable in construction and which may be operated with the expenditure of little effort and by a simple manipulation of a controlling mechanism hereinafter to be described.

Further objects will hereinafter appear.

The invention consists of the parts and the construction and combination of parts as hereinafter more fully described and claimed, having reference to the accompanying drawings, in which—

Figure 1 is a plan view, partly broken away, of an automobile, showing the upper cover of the transmission case removed. Fig. 2 is a detail view, partly in section, of the countershaft and gears. Fig. 3 is an end view of same. Fig. 4 is a sectional view of the countershaft and controller bar showing the position of the pawls. Fig. 5 is a cross section on line 5—5, Fig. 4. Fig. 6 is a detail perspective view of the controller bar.

A indicates the main frame of an automobile, 2 the engine, and 3 the rear drive-shaft to which power is transmitted through the usual form of differential mechanism inclosed by housing 4. B indicates, in general, the transmission mechanism which is interposed between the engine shaft 5 and propeller shaft 6 and which forms the subject-matter of the present application.

The transmission mechanism as a whole is suitably supported with relation to the frame A and consists of a casing C, in which is journaled a drive-shaft 7, a countershaft 8 and an intermediate shaft 9.

Suitably secured on the drive-shaft, by a key or other means, are gears 10, 11, 12, 13 and 14 through which various speeds ahead are transmitted, and similarly secured on the drive-shaft are gears 15 and 16 for reverse driving.

Intermeshing with gears 10, 11, 12, 13 and 14 are gears $10^a$, $11^a$, $12^a$, $13^a$ and $14^a$. These gears are turnably mounted on the countershaft, but any one of said gears may be locked to turn in unison with the countershaft through means hereinafter to be described.

The countershaft is also provided with a pair of reversing gears $15^a$ and $16^a$ which intermesh with gears 15 and 16 through a pair of connecting intermediate gears $15^b$ and $16^b$. The countershaft is hollow and power is transmitted to same from the engine through gears 17 and 18.

Gears $10^a$, $11^a$, $12^a$, $13^a$, $14^a$, $15^a$ and $16^a$ are all loosely mounted on bearing bushings 19 which are secured on the countershaft. Each gear is offset, as indicated at 20, to form a hollow recess in which is mounted a disk 21, there being one disk for each gear. These disks are all keyed to the countershaft.

Formed on the inner side of each disk is a radially disposed groove or guideway in which is mounted a locking bar or pawl 22. Each pawl is adapted to be projected outwardly into engagement with one or another of a plurality of teeth 23 formed on the inner rim of each gear and will thus form a driving connection between the disk and gear, causing the two to revolve in unison with the countershaft.

Each pawl or locking bar is projected outwardly into engagement with its respective gear in progressive order in the following manner: Slidably mounted inside of the countershaft is a square shaped controller bar 24. This bar consists of a section of channel iron substantially as shown in Fig. 6, inside of which is secured a pair of guide plates 25 and a cam 26. The guide plates do not extend clear down to the bottom of the channel bar, but are sufficiently raised to form grooves between the lower edges of the guide plates and the channel bar, which are adapted to receive the T-shaped heads 28 of extensions 29 formed on the inner end of each pawl. The side plates are cut away, as at 30, to conform with the shape of the cam, thus permitting each pawl to be raised or lowered as the controller bar is moved in or out.

The controller bar may be moved in or out with relation to the counter shaft for the purpose of locking the gears by any suitable means. The following mechanism is, however, employed in the present instance: Slidably mounted in one end of the transmission case is a rack bar 31, which is connected with the controller bar by means of the socket joint 32, and intermeshing with the rack bar is a spur gear 33 which is turned to move the rack and connected controller bar in one direction or the other by means of a hand controlled lever 34 carried by the steering post, just below the wheel, and the gear train indicated at 35 and 36.

A clutch 37 of suitable construction is in the present instance interposed between the drive-shaft and propeller shaft, said clutch being operated in the usual manner by a foot pedal 38. No clutch is needed between the engine and transmission mechanism in this device.

The operation of the transmission mechanism will be as follows: When the engine is running and it is desired to go ahead, it is only necessary to move hand lever 34 in the direction of arrow $a$. This will cause the rack, with connected controller bar, to move in the direction of arrow $b$ and this movement will bring the cam on the controller bar in a position where it will project the pawl or locking bar in gear 10ª in an outward direction, where the gear will be locked with its connected disk 21. Movement will thus be transmitted from the engine, through gears 17 and 18, countershaft 8 and gears 10ª and 10, to revolve the drive-shaft. Power is then transmitted through the clutch and propeller shaft through the differential mechanism to the rear drive-shaft of the car indicated at 3. Gears 10 and 10ª transmit the low speed. As the car gains momentum it is only necessary to move lever 34 sufficiently far to pull the controller bar into the next position where it will lock gears 11 and 11ª. The same cycle of operation is continued until gears 14 and 14ª are finally locked; these gears transmitting the highest speed possible. The change from one set of gears to another can be made in this instance without throwing out the clutch, as the change in speed ratio from one set of gears to another is so small that no perceptible shock will be transmitted.

The operation of the reversing gears is exactly the same as that explained in connection with gears 10, 11, 12, 13 and 14. An intermediate position is, however, formed on the counter-shaft between the forward driving gears and the reversing gears. This permits the controller bar to stand in intermediate position while the engine is running.

The gears employed in the present transmission are always intermeshing with each other and are never moved longitudinally. Any chance of stripping the gears or chipping the corners of same is thus avoided. The changing from one gear to another is accomplished in the easiest manner possible, as it is only necessary to move the hand lever 34 in the desired direction.

Any suitable means may be provided for the purpose of locking the hand lever 34 in any position. The construction of the universal connection between the rack and controller bar permits this to move longitudinally with relation to the countershaft and will at the same time permit the controller bar to revolve with the countershaft without affecting or changing the adjustment between the controller bar and rack member.

Any suitable means may be employed for the purpose of moving the controller bar and I do not wish to limit myself to the specific mechanism here shown.

By referring to Fig. 1, it will be seen that five speeds ahead are provided and two speeds for the reverse. This may be changed to alter various conditions and requirements. For instance, it is possible to have only one speed for the reverse and a greater number than shown for forward driving; that is, a plurality of speeds may be secured forward or reverse without changing the principle of the present construction.

The materials and finish of the several parts of the transmission are such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. In a transmission mechanism, the combination of a casing, a countershaft journaled in said casing, a drive-shaft journaled in the casing, a plurality of gears secured on the drive-shaft, a plurality of gears loosely mounted on the countershaft and intermeshing with the first named gears, a plurality of disks secured on the countershaft, one for each gear, teeth formed on the inner rim of each of said countershaft gears, a locking bar slidably mounted in each disk, a controller bar slidably mounted in the countershaft, a T-shaped projection formed on the inner end of each locking bar and extending through the countershaft for slidable engagement with the controller bar, a cam on said controller bar adapted to engage said projections, one at a time, to project each locking bar out into engagement with the teeth on the connected gear to form a driving connection between the disk and gear, means for driving the countershaft, and means for moving the controller bar longitudinally interior of the countershaft.

2. In a transmission mechanism, the combination of a casing, a countershaft journaled in said casing, a drive-shaft journaled in the casing, a plurality of gears secured on the drive-shaft, a plurality of gears loosely mounted on the countershaft and intermeshing with the first named gears, a plurality of disks secured on the countershaft, one for each gear, teeth formed on the inner rim of each of said countershaft gears, a locking bar slidably mounted in each disk, a controller bar slidably mounted in the countershaft, projections formed on the inner end of each locking bar extending through the countershaft into engagement with the controller bar, a cam on said controller bar adapted to engage said projections, one at a time, to project each locking bar out into engagement with the teeth on the connected gear to form a driving connection between the disk and gear, means for driving the countershaft, means for moving the controller bar longitudinally interior of the countershaft, said means comprising a rack bar, a socket joint connecting the controller bar and rack bar, a gear intermeshing with the rack bar, and manually controlled means for revolving said gear to move the connected bars.

3. In a transmission mechanism, the combination of a casing, spaced shafts journaled therein, a plurality of gears secured to one shaft, a plurality of spaced disks secured on the other shaft, a plurality of gears loosely mounted on the last shaft and interposed between the disks, each loose gear being formed with an annular recess to receive the companion disk and having the peripheral wall of the recess opposing the periphery of the disk and provided with an inward projection, a locking bar slidably carried by each disk and adapted for projection beyond the periphery of the disk to engage the inward projection of the respective loose gear, and means for projecting the bar.

4. A transmission mechanism including a rotatably supported hollow shaft formed with a longitudinal slot, a loose gear rotatable on the shaft, a locking bar slidably supported on the shaft and adapted to be slid into operative engagement with the gear to lock the latter to the shaft for movement therewith, a T-shaped projection on the locking bar operable in the shaft slot and having its cross head extending into the hollow portion of the shaft, and a U-shaped controller bar slidable in the hollow shaft and slidably interlocking with the T-shaped projection, said controller bar being formed with means to slide the locking bar on sliding movement of the controller bar.

5. A transmission mechanism including a rotatably supported hollow shaft formed with a longitudinal slot, a loose gear rotatable on the shaft, a locking bar slidably supported on the shaft and adapted to be slid into operative engagement with the gear to lock the latter to the shaft for movement therewith, a T-shaped projection on the locking bar operable in the shaft slot and having its cross head extending into the hollow portion of the shaft, a U-shaped controller bar slidable in the hollow shaft and receiving the projection of the locking bar between its sides, and a guide plate secured to each side of the U-bar for engagement over an arm of the T-projection, said U-bar being provided with a cam for sliding the locking bar on movement of the controller bar.

In testimony whereof I have hereunto set my hand in the presence of two subscribing witnesses.

ANDREW S. ANDERSON.

Witnesses:
 JOHN H. HERRING,
 WILLIAM B. RICHMOND.